US006804986B2

(12) United States Patent
Patouraux

(10) Patent No.: US 6,804,986 B2
(45) Date of Patent: Oct. 19, 2004

(54) METHOD AND APPARATUS FOR DETERMINING A CALIBRATED VALUE FOR THE YAW ANGLE OF A SATELLITE

(75) Inventor: Christian Patouraux, Junglinster (LU)

(73) Assignee: SES Astra S.A., Chateau de Betzdorf (LU)

( * ) Notice: Subject to any disclaimer, the term of this patent is extended or adjusted under 35 U.S.C. 154(b) by 0 days.

(21) Appl. No.: 09/847,268

(22) Filed: May 2, 2001

(65) Prior Publication Data

US 2002/0116993 A1 Aug. 29, 2002

Related U.S. Application Data

(63) Continuation of application No. PCT/EP99/08546, filed on Nov. 8, 1999.

(30) Foreign Application Priority Data

Nov. 6, 1998 (EP) .............................................. 98120693

(51) Int. Cl.[7] .............................................. G01C 17/38
(52) U.S. Cl. ........................................................ 73/1.78
(58) Field of Search ................................ 73/1.78, 1.75, 73/1.76, 1.77, 178 R

(56) References Cited

U.S. PATENT DOCUMENTS

| 4,827,422 A | 5/1989 | Savoca |
| 5,257,760 A | 11/1993 | Savoca |
| 5,319,968 A | 6/1994 | Billing-Ross et al. |
| 5,556,058 A | 9/1996 | Bender |

FOREIGN PATENT DOCUMENTS

EP    0 174 715    3/1986

Primary Examiner—William Oen
(74) Attorney, Agent, or Firm—Wolf, Greenfield & Sacks, P.C.

(57) ABSTRACT

The method according to the invention allows to determine the yaw angle of a satellite from the reading of two different sensors measuring the roll and/or pitch angles, provided that the reference point of the two sensors are not identical. A description is given basically for geostationary satellites but the method can be applied directly to satellites which are stationary with respect to any star. The method can be employed for circular and non-circular orbits.

4 Claims, 2 Drawing Sheets

METHOD AND APPARATUS FOR DETERMINING A CALIBRATED VALUE FOR THE YAW ANGLE OF A SATELLITE

CROSS REFERENCE TO RELATED APPLICATION

This application is a continuation of prior application No. PCT/EP99/08546, filed Nov. 8, 1999.

The invention relates to a method and an apparatus for determining the yaw angle of a satellite.

In order to effectively control satellites, especially geostationary satellites, the exact orientation of the satellite has to be known. Apart from other values, the roll angle, the pitch angle and the yaw angle, which will described in greater detail further below, have to be measured or estimated. Most geostationary, so called "three-axis stabilized" satellites are provided with sensors that allow to measure and actively control the roll and pitch angle. In this case, no sensor is provided for measuring the yaw angle. The yaw angle is usually estimated and controlled by means of the roll/yaw coupling that occurs throughout the orbit when an angular momentum bias is present on the spacecraft, for instance when a momentum wheel is spinning inside. Since this coupling is actually very light, a proper yaw angle estimation and correction takes several hours. Although these spacecrafts also are usually equipped with rate measurement assemblies like gyroscopes with a fast measurement response around all three axes, the latter are only used for autonomous attitude measurements over short periods of time for instance when the attitude is expected to be disturbed like during station keeping maneuvers. The reason is that the integrated angle tends to drift away due to the presence of an inherent bias in the measured rates. In addition, when the rate measurement devices are gyroscopes the risk of mechanical wear leads the operators to turn them off whenever their use is not absolutely required.

Even though these types of satellites usually control their yaw angle very acceptably without measuring it, there are cases when a fast yaw measurement is highly desirable like after an unexpected attitude disturbance or when not enough angular momentum bias is present to allow sufficient coupling between the roll and yaw angles, for instance when the momentum wheel has failed. A daily monitoring of the yaw angle profile is also useful to evaluate the health of the attitude control system.

Against this background the technical problem to be solved is to provide a method and an apparatus for determining the yaw angle of a satellite on the basis of sensor measurement signals readily available at the satellite, i.e. without the requirement of additional sensors.

A very advantageous aspect of the invention is the fact that the invention needs no estimation schemes which introduce a considerable delay in computing the yaw angle. Rather the invention makes use of a direct measurement of the yaw angle by means of sensors already present on the satellite. This makes it possible to provide a fast yaw measurement avoiding to collect hours of data before be able to infer a good yaw estimation.

The method is not based on a model matching estimation scheme as mentioned hereabove, but on a direct measurement of the yaw angle purely based on the geometry of the sensors. In other words, this method does not require long data collection periods, but only needs one measurement on two sensors to infer a yaw angle. This is particularly of interest when the spacecraft undergoes some unexpected attitude disturbance. In this case, if a model-matching estimation scheme is used, since the model would not fit the observation, the whole data collection should be restarted after the disturbance for proper yaw estimation. With the method according to the invention, only one measurement, at some point in time, of two offset sensors would be needed before, during or after the disturbance to infer a valid yaw measurement. Furthermore, this method does not suffer any observability problem. Hence, the method is fast and reliable and is perfectly suited for real time or historical monitoring of yaw pointing.

Another important aspect of the invention is to monitor the performances of all different subsystems of a satellite for supervision and error recovery.

This monitoring sometimes highlights deficiencies of some subsystems. Upon deficiency detection, corrective operations are undertaken to either enhance the performance or prevent further damages. Monitoring the proper functioning of the yaw pointing control is part of this overall monitoring task. A poor or unexpected yaw pointing is not only liable to affect the satellite's mission (poor broadcasting, poor images, . . . ) but is also a clue of poor attitude control, possibly due to on-board hardware or software faults. An usual way to monitor the yaw pointing is to record the roll pointing profile over several hours or days. Indeed, due to the lack of direct yaw sensor mounted on-board of the spacecraft, many of these spacecrafts control or estimate their yaw angle based on the orbital coupling between roll and yaw angles. By recording the roll angle profile over a sufficient amount of time, the ground station can infer the yaw angle profile over the same time span. This is done by applying some numerical estimation scheme to the roll angle data, using a numerical model of the spacecraft's dynamics and kinematics. For instance, a least square fitting can be worked out in that workframe. These estimation methods are based on the adjustment of the model's parameters to match the way the roll profile has varied over the period of observation. However, not only these methods require long observation durations for accurate yaw estimation, due to low coupling between roll and yaw, they also require very good modeling of the environmental disturbance torques for proper modeling of the spacecraft dynamics. If, during the roll angle data collection period, anything unexpected happens to the spacecraft attitude that is not taken into account into the numerical model of the spacecraft, like an external disturbance, the resulting estimated yaw angle could be way off the real yaw angle. In this case, the roll angle data collection must be restarted after the unexpected event which further delays the yaw estimation. In addition, depending on the available sensors, the exposed yaw angle estimation method often suffers an observability problem. Indeed, the aforementioned environmental torque modeling is usually achieved through a limited fourier series development of the torques around the yaw and roll axes. If the spacecraft only disposes of a roll angle and a pitch angle measurement device, the constant term of the fourier series of the yaw environmental torque is not distinguishable from the yaw angle itself. Therefore, in this case, the yaw is not estimated as such, but the estimation outputs the sum of the yaw angle and the influence of the constant term of the yaw environmental torque. In this configuration, it is impossible to verify the magnitude of the parasitical effect of the torque's constant term. If this effect is large, it will significantly bias the whole yaw estimation.

Hence, the method according to the invention can be implemented in real time and allows the operator not only to verify the magnitude of the yaw angle at some point in time, but also to track the profile of the yaw angle throughout hours, days or years. It for instance allows comparisons of daily yaw profiles to make sure there is no attitude control performance degradation or unexpected variation in yaw angle. It could also be looked at if there is any clue of yaw transient (e.g. poor broadcasting).

A further aspect of the present invention deals with the calibration of the yaw angle measurement which is performed as mentioned above.

The theory assumes perfectly stable sensors whose boresights are always pointing in the same direction with respect to the satellite's coordinate frame. However, real attitude sensors are not perfect. Their reading and pointing are for instance quite sensitive to thermal variation or aging. For instance, due to the daily rotation of a geostationary spacecraft's body, the structure on which a sensor is mounted follows a daily distortion cycle due to cycling sun exposure. Another source of spurious error can be a initial misalignment of the sensor on the spacecraft body.

Hence, applying the yaw measurement as mentioned above, a further problem occurs in calibrating this yaw measurement also readily available at the satellite without a requirement of additional sensors.

The method according to the invention allows to measure the yaw angle from the reading of two different sensors measuring the roll and/or pitch angles, provided that the reference point of the two sensors are not identical. The description is given basically for geostationary satellites but the invention can be applied directly to satellites which are stationary with respect to any star. The method can also be employed for non circular orbits. The method assumes that the orbit of the spacecraft is known at any time.

In the following, the method and the apparatus according to the invention and its principles will be explained in greater detail with reference to the drawings of which FIG. 1 shows a view of an orbiting satellite in an earth orbit for illustrating a reference coordinate system.

In order to define the position and orientation of a satellite, there is a need for the definition of a reference frame, i.e. a triplet of axes virtually attached to the body of the satellite, the latter being considered as infinitely rigid.

The following discussion will be limited to geostationary satellites. In this case, the location of the center of the frame (orbit) is less involved in the following development. It should be noted that in any case the orbit only affects the location of the reference points of the sensors on earth. So if the orbit is not geostationary, the location of the reference points on the earth deterministically vary throughout this orbit.

Figure 1:
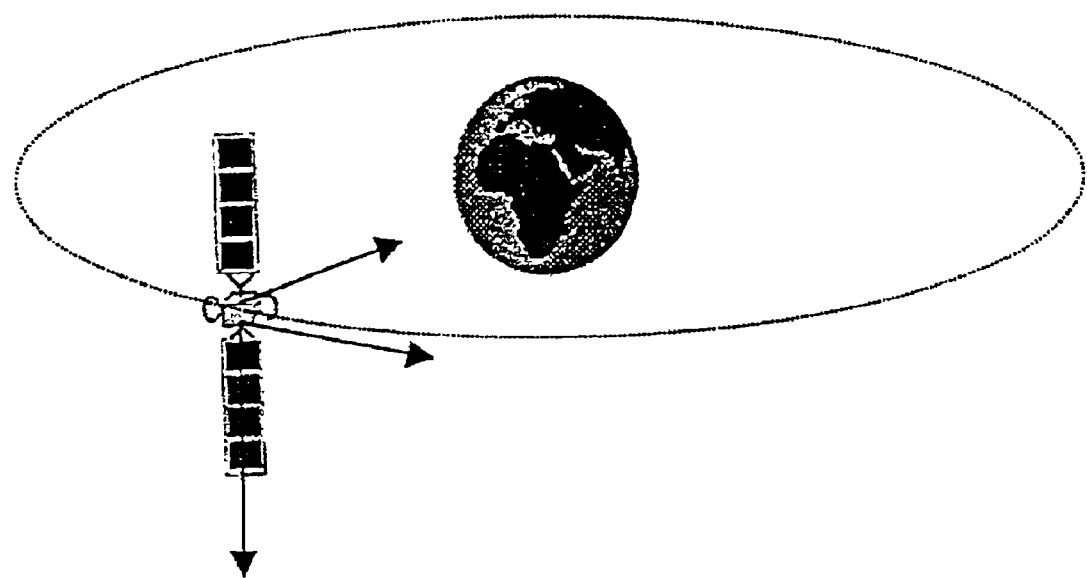

The three axes are named roll, pitch and yaw and are oriented as shown in FIG. 1, i.e.

| roll: | along the velocity vector of the satellite (tangential to the orbit) |
| pitch: | perpendicular to the orbit plane of the satellite, directed towards south; |
| yaw: | nominally towards the center of the earth so as to close the tri-orthogonal right-hand oriented frame. |

The orientation of the satellite, further called "attitude" can be specified in terms of rotations about these three axes so that one may speak of roll, pitch and yaw angles. Roll, pitch and yaw angles are actually "Euler angles". This means that they represent the orientation of a body with respect to a reference orientation by consecutive rotations around the corresponding axes. The final orientation depends on the order of rotations. In other words, if the yaw/pitch/roll order of rotations is picked, then starting from the reference frame of FIG. 1, the final attitude is reached by first rotating the frame around the yaw axis, then rotating the frame around the new pitch axis, then around the new roll axis. The final orientation would not be the same if the rotations were performed, with the same magnitude, but in a different order. However, if the magnitude of the rotations are small enough, the final attitude becomes almost independent of the order of rotations. This approximation is often applied when the attitude errors of a properly controlled geostationary satellite are considered, since its pointing errors are very small.

Figure 2:
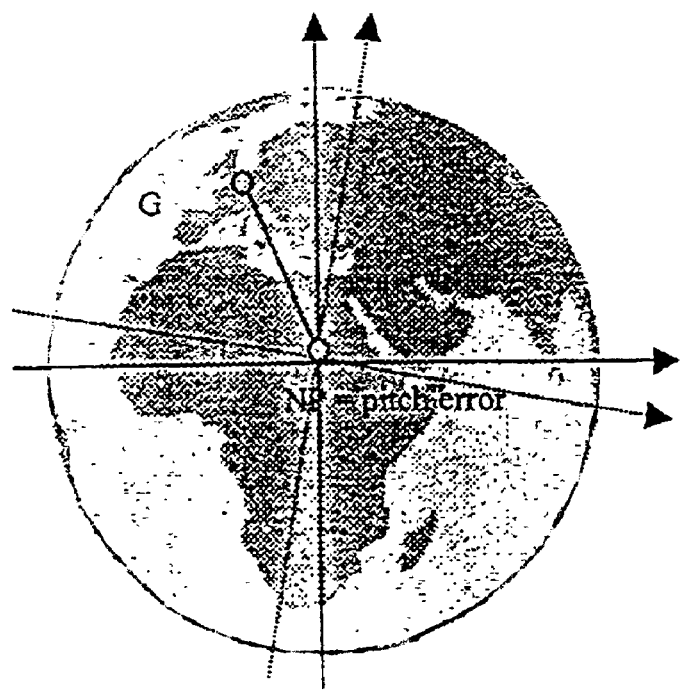
FIG. 2 shows a view of the earth from orbiting satellite including geometric indicators for explaining roll and pitch angles with and without the presence of a yaw angle.

FIG. 2 shows the earth seen from a satellite, as well as the directions P and R in which pitch and roll errors will move a beam sent by the satellite on the earth. The solid lines show the directions along which roll and pitch errors would be measured if there were no yaw error, the dotted lines give the same information but when some positive yaw error is present.

As an example and as shown in FIG. 2, points G and N locate distinct reference points of two sensors provided on-board the satellite. The reference point of each sensor is defined as the location it points to when the errors it reads are zero.

As an example, two sensors used on-board the ASTRA satellites are considered in the following, but different kinds of sensors may be used as well. One sensor is an optical infrared earth sensor assembly (ESA) with the subnadir point N (center of the earth) as its reference point. The other sensor is a beacon sensor with the ground station G as its reference point. Each sensor issues roll and pitch angle attitude errors defining the difference between the direction it points to, its "boresight", and its reference point (identified by points G and N). The satellite transmits the telemetry values of the measured roll and pitch angles of both sensors to the ground station which records them for further processing and/or analysis. The roll and pitch errors of at least one of the sensors are also sent to the on-board processor for roll and pitch control.

It should be noted again that the method explained below extends to any kind of pair of sensors measuring roll and pitch angles or two linear combination of these angles, as long as the reference points G and N of the two sensors are different. In addition, the method can also readily be extended to a point N not being on the center of the earth.

The roll and pitch angles are often represented like planar coordinates as in FIG. 2. However, since these angles are actually Euler angles, this representation is only valid for small angles.

Figure 3:
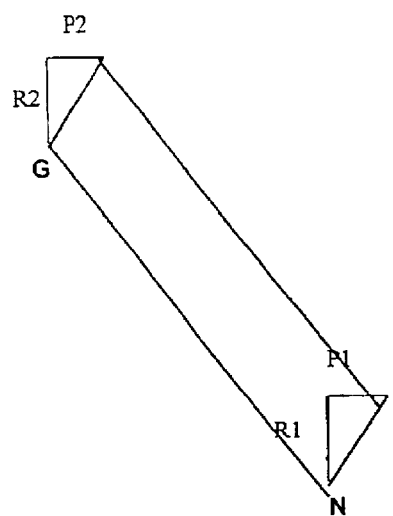
FIG. 3 shows a geometric relation for explaining the principles of the method according to the invention.

According to the definitions above, roll and pitch errors with a zero yaw error would show up as shown in FIG. 3, where R1, P1 and R2, P2 are the errors measured by the two sensors in roll and pitch. Of course, the length of the segment joining the boresights of the two sensors when there is an off-pointing (an attitude error) is the same as when there is no error (line joining points N and G).

Figure 4:
FIG. 4 shows a view of the earth from an orbiting satellite including geometric indicators for explaining the principles of the method according to the invention.

If a yaw error y exists, as shown in FIG. 4, the direction in which roll and pitch errors are measured would be canted by y. In this situation, the readings of R1, P1 and R2, P2 are not equal anymore between the two sensors. This means information about the yaw angle is captured in the difference between the readings of the two sensors.

In order to retain only the yaw information, and since R1 and P1 are assumed to be small angles, which means that a planar representation can be applied, the actual roll and pitch errors can be eliminated by geometrically translating R2 and P2 respectively by R1 and P1 ending up on point G' as shown in FIG. 5. When using the difference between the reading of the roll error on one hand and between the readings of the pitch error on the other hand two angle Delta_p and Delta_r can be defined:

$$Delta\_p = P2 - P1 \quad (1)$$

$$Delta\_r = R2 - R1 \quad (2)$$

In other words, the problem is now reduced to a pure yaw angle, resulting in the second sensor to read Delta_p and Delta_r namely the coordinates of point G', and the first sensor to read zero.

Although not really necessary, it can be assumed that Delta_p and Delta_r are small angles. This slightly simplifies the considerations below. This assumption has been verified for all ASTRA spacecrafts since a yaw angle of the order of a degree leads to Delta_p and Delta_r which are about one tenth thereof.

In order to find the yaw angle provoking a Delta_p and Delta_r, that yaw angle has to be determined that would rotate point G to point G', i.e. that would make the second sensor to read the errors Delta_p and Delta_r. Knowing that point G is defined by the consecutive pitch (azimuth) and roll (elevation) rotations that bring the center of the earth to the reference point of the second sensor and point G' is defined as the pitch and roll rotations that bring the center of the earth, as seen from the spacecraft, to a location where the second sensor reads Delta_p and Delta_r.

The following equations represent the rotations of a vector pointing from the spacecraft to the center of the earth: on one side, a pitch rotation (pitch_GP) followed by a roll rotation (roll_GP) with no yaw rotation which bring the center of the earth to G' and, on the other side, a pitch rotation (pitch_G) followed by a roll rotation (roll_G) which bring the center of the earth to G, and finally followed by a yaw rotation that brings point G to point G'.

$$\begin{bmatrix} 1 & 0 & 0 \\ 0 & \cos(roll\_GP) & -\sin(roll\_GP) \\ 0 & \sin(roll\_GP) & \cos(roll\_GP) \end{bmatrix} \cdot \quad (3)$$

$$\begin{bmatrix} \cos(pitch\_GP) & 0 & \sin(pitch\_GP) \\ 0 & 1 & 0 \\ -\sin(pitch\_GP) & 0 & \cos(pitch\_GP) \end{bmatrix} \cdot \begin{bmatrix} 0 \\ 0 \\ 1 \end{bmatrix} =$$

$$\begin{bmatrix} \cos(yaw) & -\sin(yaw) & 0 \\ \sin(yaw) & \cos(yaw) & 0 \\ 0 & 0 & 1 \end{bmatrix} \cdot \begin{bmatrix} 1 & 0 & 0 \\ 0 & \cos(roll\_G) & -\sin(roll\_G) \\ 0 & \sin(roll\_G) & \cos(roll\_G) \end{bmatrix} \cdot$$

-continued $$\begin{bmatrix} \cos(pitch\_G) & 0 & \sin(pitch\_G) \\ 0 & 1 & 0 \\ -\sin(pitch\_G) & 0 & \cos(pitch\_G) \end{bmatrix} \cdot \begin{bmatrix} 0 \\ 0 \\ 1 \end{bmatrix}$$

The above expression defines a system of three equations with only "yaw" as an unknown. For the ASTRA spacecrafts, the variables pitch_G and roll_G are actually the azimuth and elevation of the ground station (Betzdorf, Luxembourg) as seen from the spacecraft, while since Delta_p and Delta_r are small the angles pitch_GP and roll_GP can be defined as follows:

$$pitch\_GP = pitch\_G + Delta\_p \quad (4)$$

$$roll\_GP = roll\_G + Delta\_r. \quad (5)$$

Developing system (3), it yields:

$$\sin(pitch\_GP) = \cos(yaw)*\sin(pitch\_G) + \sin(yaw)*\sin(roll\_G)*\cos(pitch\_G) \quad (6)$$

$$-\sin(roll\_GP)\cos(pitch\_GP) = \sin(yaw)*\sin(pitch\_G) - \cos(yaw)*\sin(roll\_G)*\cos(pitch\_G) \quad (7)$$

$$\cos(roll\_GP)*\cos(pitch\_GP) = \cos(roll\_G)*\cos(pitch\_G) \quad (8)$$

With $$A = \sin(pitch\_GP) \quad (9)$$

$$B = -\sin(roll\_GP)*\cos(pitch\_GP) \quad (10)$$

$$C = \sin(pitch\_G) \text{ and} \quad (11)$$

$$D = \sin(roll\_G)*\cos(pitch\_G) \quad (12)$$

and by eliminating cos(yaw) between equations (6) and (7), the above equations (6), (7) and (8) can be reduced to $$\sin(yaw) = (B*D - A*C)/(B*B + C*C) \quad (13)$$

and by substitution, $$\cos(yaw) = (A*B + D*C)/(B*B + C*C) \quad (14)$$

Since the yaw angle is usually small (a couple of degrees at most on ASTRA spacecrafts), equation (13) is often enough to determine the yaw angle and its sign. Therefore, most of the time, only one equation is sufficient. However, equation (8) and (14) can provide additional information to refine the yaw angle.

The yaw angle as measured this way has already been shown to fit the integration of yaw gyro rates, for instance. It will be an invaluable source of attitude information, especially in cases where the knowledge of the yaw angle becomes critical.

The above described method is based on measurement values from two sensors as mostly used in geostationary satellites, for example the ASTRA satellites. However, the principle of the invention can also be used even if measurement values of only two single sensors, for example two single roll sensors or two single pitch sensors are available since two independent equations exist. In the following, it will be assumed that all variables, except <<yaw>> and <<roll_GP>> are known. In other words, only the pitch angle is measured.

However, the location of G is still known in roll and pitch. We can use eq. (6) to determine <<yaw>>. Indeed, only two of the above given equations (6), (7) and (8) are independent. The combination of equations (6), (7) and (8) reflects only that the length of the unit vector (0 0 1) is conserved throughout the successive rotations. Hence, two independent equations exist so that two variables could be unknown. It should be noted that the third equation could still be used to help solving the problem. Previously, it had been demonstrated that the problem was solved easily if all variables, except <<yaw>> were known. In the following, it will be assumed that all variables, except <<yaw>> and <<roll_GP>> are known. In other words, only the pitch angle is measured. However, the location of G is still known in roll and pitch. We can use eq. (6) to determine <<yaw>>.

Developing system (3), it yields:

$$-\cos(yaw)*\sin(pitch\_G)=\sin(yaw)*\sin(roll\_G)*\cos(pitch\_G)-\sin(pitch\_GP) \quad (15)$$

and squaring both sides of equation (15) leads to:

$$[1-\sin^2(yaw)]*\sin^2(pitch\_G)=\sin^2(yaw)*\sin^2(roll\_G)*\cos^2(pitch\_G)+\sin^2(pitch\_GP)-2*\sin(yaw)*\sin(roll\_G)*\cos(pitch\_G)*\sin(pitch\_GP) \quad (16)$$

and finally to a quadratic equation in sin(yaw):

$$\sin^2(yaw)*[\sin^2(pitch\_G)-\sin^2(roll\_G)*\cos^2(pitch\_G)]=\sin(yaw)*[2*\sin(roll\_G)*\cos(pitch\_G)*\sin(pitch\_GP)]=\sin^2(pitch\_G)-\sin^2(pitch\_GP)=0 \quad (17)$$

which can easily be solved to determine the yaw angle as follows:
Let:

$$E=(\sin(pitch\_G)*\sin(pitch\_G))-(\sin(roll\_G)*\cos(pitch\_G)*\sin(roll\_G)*\cos(pitch\_G))$$

$$F=2*\sin(roll\_G)*\cos(pitch\_G)*\sin(pitch\_GP);$$

$$G=\sin(pitch\_G)*\sin(pitch\_G)-\sin(pitch\_GP)*\sin(pitch\_GP);$$

$$\sin(yaw)=(-F\pm sqrt(F*F-4*E*G))/(2*E);$$

Then perform the arcsin on sin(yaw) if abs(sin(yaw))<=1. Practically, pick yaw closest to zero if several solutions are available.

Another simplifying is possible by solving the yaw equations with 2 sensor measure measurements on the basis of roll channels only.

Taking back equations (7) and (8):

$$-\sin(roll\_GP)\cos(pitch\_GP)=\sin(yaw)*\sin(pitch\_G)-\cos(yaw)*\sin(roll\_G)*\cos(pitch\_G)$$

$$\cos(roll\_GP)*\cos(pitch\_GP)=\cos(roll\_G)*\cos(pitch\_G)$$

"cos(pitch_GP) can be eliminated from these two equations, giving:

$$-\sin(roll\_GP)*\cos(roll\_G)*\cos(pitch\_G)/\cos(roll\_GP)=\sin(yaw)*\sin(pitch\_G)-\cos(yaw)*\sin(roll\_G)*\cos(pitch\_G)$$

$$\sin(roll\_GP)*\cos(roll\_G)*\cos(pitch\_G)/\cos(roll\_GP)+\sin(yaw)*\sin(pitch\_G)=\cos(yaw)*\sin(roll\_G)*\cos(pitch\_G)$$

let $$M=\sin(roll\_GP)*\cos(roll\_G)*\cos(pitch\_G)/\cos(roll\_GP)$$

squaring both sides of this equation gives:

$$M^2+\sin^2(yaw)*\sin^2(pitch\_G)+2*\sin(yaw)*\sin(pitch_{13}G)*M=(1-\sin^2(yaw))*\sin^2(roll\_G)*\cos^2(pitch\_G)$$

and finally, again ends up in a quadradtic equation in sin(yaw) where everything is known except the yaw $$\sin^2(yaw)*(\sin^2(pitch\_G)+\sin^2(roll\_G)*\cos^2(pitch\_G))+$$

$$\sin(yaw)*2*\sin(pitch\_G)*M+$$

$$M^2-\sin^2(roll\_G)*\cos^2(pitch\_G)$$

$$=0$$

Again, letting $$H=(\sin^2(pitch\_G)+\sin^2(roll\_G)*\cos^2(pitch\_G))$$

$$K=2*\sin(pitch\_G)*M$$

and $$L=M^2-\sin^2(roll\_G)*\cos^2(pitch\_G)$$

yields the following equation $$\sin(yaw)=(-K\pm sqrt(K*K-4*H*L))/(2*H);$$

Then perform the arcsin on sin(yaw) if abs(sin(yaw))<=1. Practically, pick yaw closest to zero if several solutions are available.

These methods with single channels from both sensors allow to collect less data than a method with both roll and pitch data from both sensors. They allow to keep computing the yaw even if roll or pitch data are not available for some reason.

Then, equations (6) and (7) can be used to determine the delta roll angle:

$$\sin(roll\_GP)=-[\sin(yaw)*\sin(pitch\_G)-\cos(yaw)*\sin(pitch\_G)-\cos(yaw)*\sin(roll\_G)*\cos(pitch\_G)]/\cos(pitch\_GP) \quad (18)$$

$$\cos(roll\_GP)=\cos(roll\_G)*\cos(pitch\_G)/\cos(pitch\_GP) \quad (19)$$

Obviously, the same kind of demonstration can be done if <<roll_GP>> is known and <<pitch_GP>> is not.

Thus it has been demonstrated that the yaw angle can be determined with two offset sensors, each one reading only one attitude angle, as long as the reference point of each sensor is known. It should be noted that this method determines <<yaw>> and <<roll_GP>> or <<pitch_GP>>, the latter ones being deduced from delta angles between the two sensor readings and not representing the real roll or pitch angle. Therefore, if the roll and pitch angles are needed for control, this method cannot determine them in addition to the yaw angle, but at least one of the sensors has to measure both roll and pitch. However, as demonstrated here above, in this particular case, both roll and pitch angles do not have to be measured to determine the yaw angle.

The following general approach will show that actually three measures are necessary to infer the roll, pitch and yaw angles. In other words, one of the sensor has to measure both roll and pitch and one of the sensor could measure either roll or pitch to allow the full determination of the attitude, i.e. roll, pitch and yaw.

Assume the same equations, but this time without any assumption on the value of the angles or on the reference point of the sensors (except being distinct):

For the first sensor:

$$\begin{bmatrix} 1 & 0 & 0 \\ 0 & \cos(RM1) & -\sin(RM1) \\ 0 & \sin(RM1) & \cos(RM1) \end{bmatrix} \cdot \begin{bmatrix} \cos(PM1) & 0 & \sin(PM1) \\ 0 & 1 & 0 \\ -\sin(PM1) & 0 & \cos(PM1) \end{bmatrix} \cdot \begin{bmatrix} 0 \\ 0 \\ 1 \end{bmatrix} =$$

-continued $$\begin{bmatrix} \cos(Y) & -\sin(Y) & 0 \\ \sin(Y) & \cos(Y) & 0 \\ 0 & 0 & 1 \end{bmatrix} \begin{bmatrix} 1 & 0 & 0 \\ 0 & \cos(R) & -\sin(R) \\ 0 & \sin(R) & \cos(R) \end{bmatrix} \cdot \begin{bmatrix} \cos(P) & 0 & \sin(P) \\ 0 & 1 & 0 \\ -\sin(P) & 0 & \cos(P) \end{bmatrix} \cdot$$

$$\begin{bmatrix} 1 & 0 & 0 \\ 0 & \cos(RR1) & -\sin(RR1) \\ 0 & \sin(RR1) & \cos(RR1) \end{bmatrix} \cdot \begin{bmatrix} \cos(PR1) & 0 & \sin(PR1) \\ 0 & 1 & 0 \\ -\sin(PR1) & 0 & \cos(PR1) \end{bmatrix} \cdot \begin{bmatrix} 0 \\ 0 \\ 1 \end{bmatrix}$$

For the second sensor:

$$\begin{bmatrix} 1 & 0 & 0 \\ 0 & \cos(RM2) & -\sin(RM2) \\ 0 & \sin(RM2) & \cos(RM2) \end{bmatrix} \cdot \begin{bmatrix} \cos(PM2) & 0 & \sin(PM2) \\ 0 & 1 & 0 \\ -\sin(PM2) & 0 & \cos(PM2) \end{bmatrix} \cdot$$

$$\begin{bmatrix} 0 \\ 0 \\ 1 \end{bmatrix} = \begin{bmatrix} \cos(Y) & -\sin(Y) & 0 \\ \sin(Y) & \cos(Y) & 0 \\ 0 & 0 & 1 \end{bmatrix} \cdot \begin{bmatrix} 1 & 0 & 0 \\ 0 & \cos(R) & -\sin(R) \\ 0 & \sin(R) & \cos(R) \end{bmatrix} \cdot$$

$$\begin{bmatrix} \cos(P) & 0 & \sin(P) \\ 0 & 1 & 0 \\ -\sin(P) & 0 & \cos(P) \end{bmatrix} \cdot \begin{bmatrix} 1 & 0 & 0 \\ 0 & \cos(RR2) & -\sin(RR2) \\ 0 & \sin(RR2) & \cos(RR2) \end{bmatrix} \cdot$$

$$\begin{bmatrix} \cos(PR2) & 0 & \sin(PR2) \\ 0 & 1 & 0 \\ -\sin(PR2) & 0 & \cos(PR2) \end{bmatrix} \cdot \begin{bmatrix} 0 \\ 0 \\ 1 \end{bmatrix}$$

| | | |
|---|---|---|
| P, R, Y | = | pitch, roll, yaw angle errors. |
| RRx, PRx | = | roll and pitch angles of the sensor's reference point (Depending on the orbit and on the direction to which the sensor points in the spacecraft coordinates; azimuth and elevation of the reference point of sensor 'x' as seen from the spacecraft). |
| RMx, PMx | = | measured roll and pitch angles (from center of a star or from the center of earth). |

All previous cases presented earlier were actually approximations or particular cases of this last case. Multiplying all these matrices together for both sensors, will provide three equations for each sensors. Again, only two of these equations are independent for each sensor. It provides four independent equations and therefore allows 4 unknowns. This time, the small angle approximation (<=10°) on the pitch and roll angle errors <<P>> and <<R>> is not applied and hence one cannot deduct the readings of both sensors to get around the determination of <<R>> and <<P>>.

Therefore, by default, three unknown variables exist: <<R>>, <<P>> and <<Y>>, what allows one more unknown. This means that for instance one of the following measure could be unknown: RM1, RM2, PM1 or PM2. Hence, in general, in order to fully determine the attitude, one sensor has to measure both roll and pitch and one sensor can measure only the roll or the pitch angle. This is actually not surprising since one has a static geometrical problem with three independent unknown variables and hence one has to measure three independent values.

Obviously the general system given here above can be developed by multiplying all matrices, but the resolution of this system is actually more difficult than the one that was presented earlier. The easiest way would be to solve the corresponding system numerically. A numerical resolution could be developed in another report if needed.

The need of calibration will be explained according to FIG. 4 by means of a distortion. This distortion is equivalent to a spurious offset or variation of point G or of point N on FIG. 4. This leads to spurious roll and pitch measurements on the affected sensor, which in turn leads to spurious yaw measurement with the method.

Most part of these spurious sensor errors are constant errors (alignment errors) and one orbit varying (daily for geostationary spacecrafts).

In order to get rid of the constant and of the daily variation, the method must be calibrated. For calibration a quiet orbit is needed, which means a full orbit revolution without attitude disturbance and without station keeping moves, without unusual external disturbances and without unusual activity affecting the satellite's attitude. The quiet orbit according to the invention is used as a reference orbit. The output of all angle sensors are then used for yaw measurement and are collected over the reference orbit which is 24 hours of data collection for geostationary satellites.

According to a first aspect of calibration, a yaw profile is computed from the collected data.

Yaw is measured with the method according to the invention with the collected data over the quiet orbit. Note that sampling time can be adjusted to match typical rate of variation of the yaw angle. When yaw angle has been computed over the quiet orbit, the method is ready for being used at any point in time. The yaw angle is computed at the desired time as explained above. The yaw computed at the same orbit location on the reference orbit is then subtracted from this computed yaw and the result gives the calibrated yaw angle.

To summarize,
1. pick a quiet orbit;
2. collect necessary data as explained above to compute yaw profile over this quiet orbit=Yreference(t) where t=time in reference orbit;
3. measure the necessary data at the time yaw measurement is desired and compute a yaw angle=Yaw__unbiased at time t0, where t0=time of day of measurement;
4. subtract point 2. result from point 3. result:
Yaw__calibrated at time t0=(Yaw__unbiased at time t0)−Yreference (t0).

This calibration method reduces the measuring of the yaw relative to the yaw that was measured at the same point on the reference orbit. It assumes that the yaw profile observed on the reference orbit was a real yaw pointing offset and variation.

According to a second aspect of calibration, a sensor profile is recorded for each angle sensor on the satellite.

This calibration consists of again picking a quiet orbit and recording necessary roll or pitch data to compute yaw on this orbit. Then, at the time yaw measure is desired, the ground station measures the set of roll or pitch data required to compute yaw. Then, deduct roll or pitch data collected at the same location on the reference orbit from respective roll or pitch data at the time yaw measurement is desired. Then, compute yaw based on calibrated set of roll or pitch data.

To summarize,
1. pick a quiet orbit;
2. collect necessary data as explained above to compute yaw profile over this quiet orbit. For instance Roll__reference__sensor1(t) and Roll__reference__sensor2(t) where t=time in reference orbit;
3. collect necessary data as explained above at the time yaw measurement is desired. For instance Roll__sensor1 at time t0 and Roll__sensor2 at time t0;

4. subtract reference data from respective data at time yaw measurement is desired:
   * Roll_sensor1 at t0 calibrated=
   (Roll_sensor1 at time t0)—Roll_reference_sensor1 (t0)
   * Roll_sensor2 at t0 calibrated=
   (Roll_sensor2 at time t0)—Roll_reference_sensor2 (t0)
5. compute calibrated yaw angle with "Roll_sensor1 at time t0 calibrated" and "Roll_sensor2 at time t0 calibrated".

This calibration method assumes that the yaw remained equal to zero throughout the reference orbit. It assumes that the yaw that would have been computed with the sensor errors on this reference orbit would only have been due to spurious errors on the sensors, like the ones coming from thermal distortion or alignment errors.

What is claimed is:

1. Method for determining a calibrated value for a yaw angle of a satellite, comprising the steps of:
   storing a yaw angle profile over a quiet orbit,
   determining a sample yaw angle at a calibration time (t0),
   determining a calibrated value by subtracting the sample yaw angle with a yaw angle profile value having a time shift in the yaw angle profile corresponding to the calibration time (t0).

2. Method for determining a calibrated value for a yaw angle of a satellite having angle sensors on board, comprising:
   storing for each of the angle sensors on board the satellite a profile over a quiet orbit,
   determining a sample value for each of the angle sensors at a calibration time (t0), determining calibrated values for each of the angle sensors by subtracting the sample values with an angle sensor profile value having a time shift in the respective angle sensor profile corresponding to the calibration time (t0), and
   determining a calibrated value for a yaw angle with calibrated values for each of the angle sensors.

3. Apparatus for determining a calibrated value for a yaw angle of a satellite, comprising:
   means for storing a yaw angle profile over a quiet orbit,
   means for determining a sample yaw angle at a calibration time (t0),
   means for determining a calibrated value by subtracting the sample yaw angle with a yaw angle profile value having a time shift in the yaw angle profile corresponding to the calibration time (t0).

4. Apparatus for determining a calibrated value for a yaw angle of a satellite having angle sensors on board comprising:
   means for storing for each of the angle sensors on board the satellite a profile over a quiet orbit,
   means for determining a sample value for each of the angle sensors at a calibration time (t0),
   means for determining calibrated values for each of the angle sensors by subtracting the sample values with an angle sensor profile value having a time shift in the respective angle sensor profile corresponding to the calibration time (t0), and
   means for determining a calibrated value for a yaw angle with calibrated values for each of the angle sensors.

* * * * *